(12) United States Patent
Segal et al.

(10) Patent No.: US 12,225,013 B2
(45) Date of Patent: *Feb. 11, 2025

(54) SECURING APPLICATION BEHAVIOR IN SERVERLESS COMPUTING

(71) Applicant: Palo Alto Networks, Inc., Santa Clara, CA (US)

(72) Inventors: Ory Segal, Tel Aviv (IL); Yuri Shapira, Holon (IL); Avraham Shulman, Tel Aviv (IL); Benny Nissimov, Givataim (IL); Shaked Zin, Tel Aviv-Jaffa (IL)

(73) Assignee: Palo Alto Networks, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/353,238

(22) Filed: Jul. 17, 2023

(65) Prior Publication Data
US 2023/0362168 A1 Nov. 9, 2023

Related U.S. Application Data

(63) Continuation of application No. 17/807,812, filed on Jun. 20, 2022, now Pat. No. 11,706,220, which is a continuation of application No. 16/795,681, filed on Feb. 20, 2020, now Pat. No. 11,425,127.

(60) Provisional application No. 62/807,773, filed on Feb. 20, 2019.

(51) Int. Cl.
*H04L 9/40* (2022.01)
*G06N 5/04* (2023.01)
*G06N 20/00* (2019.01)
*H04L 9/32* (2006.01)

(52) U.S. Cl.
CPC .............. *H04L 63/10* (2013.01); *G06N 5/04* (2013.01); *G06N 20/00* (2019.01); *H04L 9/3247* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 2019/0007458 A1* | 1/2019 | Shulman | H04L 63/1433 |
| 2019/0149480 A1* | 5/2019 | Singhvi | H04L 47/2483 |
| | | | 709/226 |
| 2019/0213326 A1 | 7/2019 | Dykes | |
| 2021/0099459 A1* | 4/2021 | Zhang | H04L 63/104 |

* cited by examiner

*Primary Examiner* — Cai Y Chen
(74) *Attorney, Agent, or Firm* — Gilliam IP PLLC

(57) ABSTRACT

A method for securing a serverless application including: (a) receiving a list of components which make up the serverless application and one or more intended usage flows of the serverless application; (b) creating and applying a security policy for each component of the serverless application, the security policy denying all access requests except from authorized components, wherein the authorized components are selected based on access requirements dictated by the one or more intended usage flows.

20 Claims, 3 Drawing Sheets

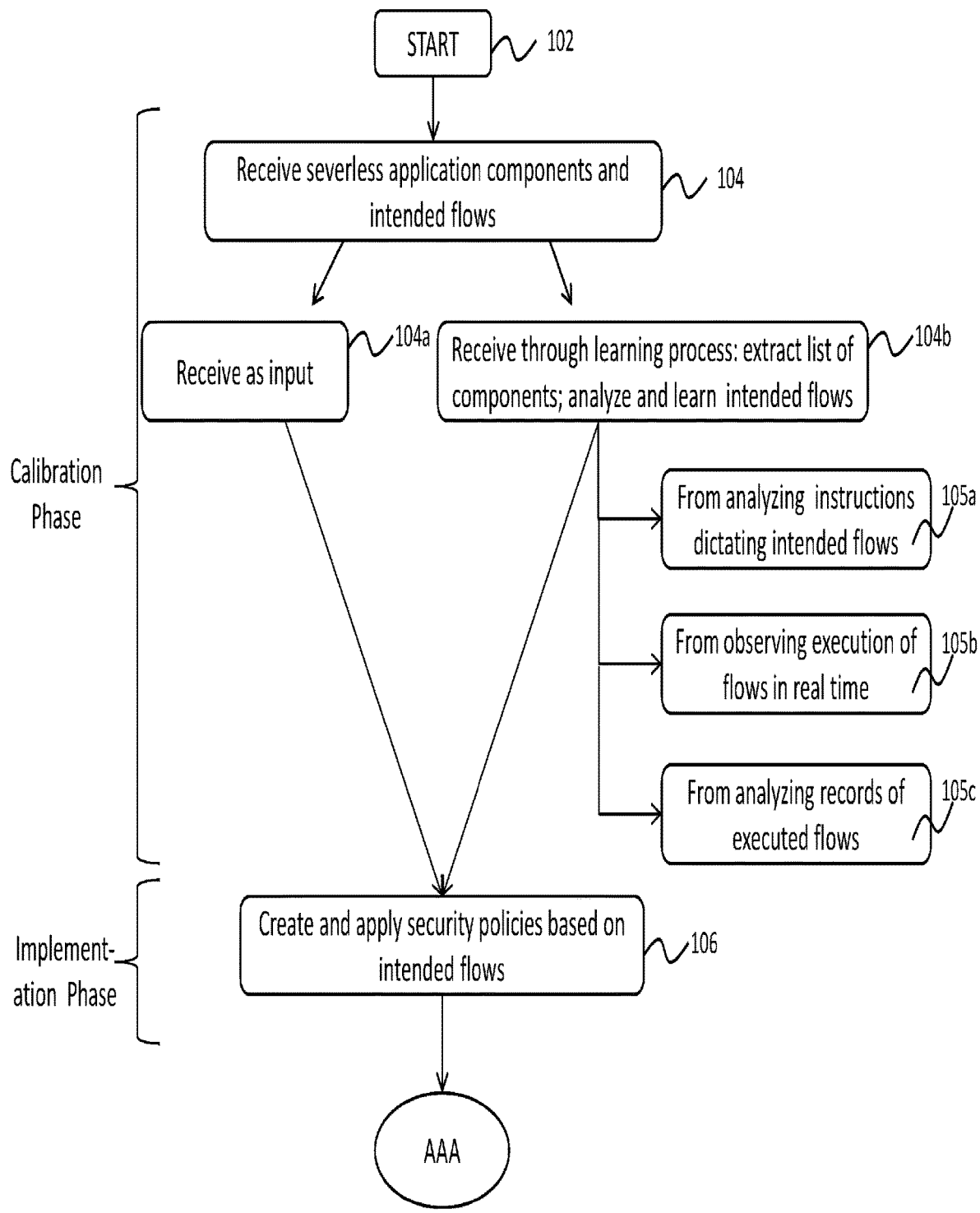

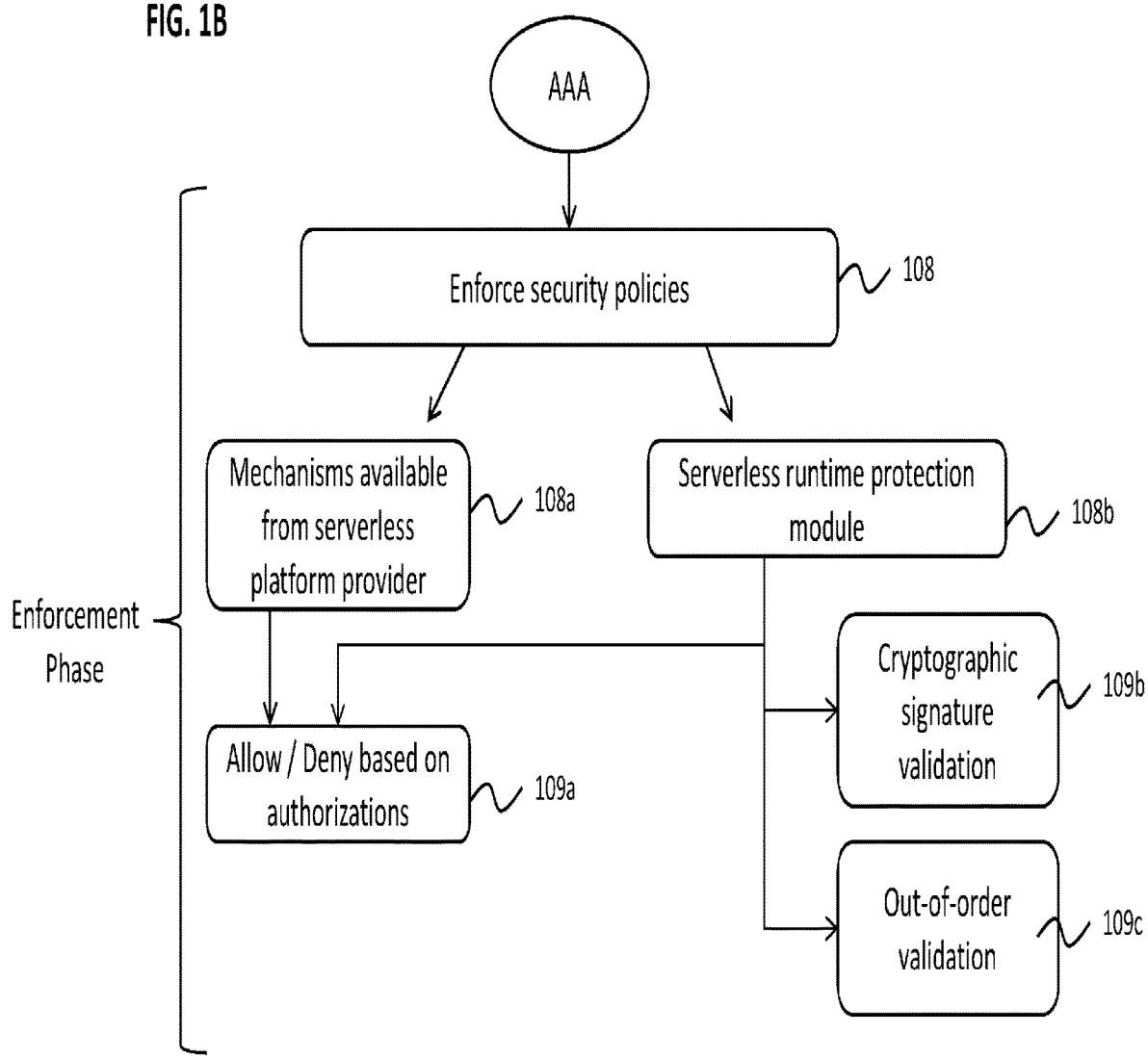

Serverless Application

SECURING APPLICATION BEHAVIOR IN SERVERLESS COMPUTING

FIELD OF THE INVENTION

This disclosure relates generally to cyber-security systems and, more specifically, to techniques for securing serverless functions.

BACKGROUND OF THE INVENTION

Organizations have increasingly adapted their applications to be run from multiple cloud computing platforms. Some leading public cloud service providers include Amazon, Inc. (Amazon), Microsoft, Inc. (Microsoft), Google, Inc. (Google), and the like. To ensure their services are not interrupted, these service providers must protect their customers against cyber security threats.

In cloud computing platforms, serverless computing is a new emerging technology that provides a cloud computing execution model in which the cloud provider dynamically manages the allocation of machine resources. Such platforms, also referred to as function as a service (FaaS) platforms, allow executing application logic but do not store data. Commercially available platforms include AWS Lambda by Amazon, Azure® Functions by Microsoft, Google Cloud Functions Cloud Platform by Google, IBM Cloud Functions® by IBM, and the like.

Serverless code can be used in conjunction with code deployed in traditional styles, such as microservices. Alternatively, applications can be written to be purely serverless and use no provisioned services at all. Further, FaaS platforms do not require coding to a specific framework or library. FaaS functions are regular applications when it comes to programming language and environment. Typically, functions in FaaS platforms are triggered by event types defined by the cloud provider. Functions can also be triggered by the manually configured events or when a function calls another function. For example, in Amazon AWS, such triggers include file (S3) updates, time (e.g., scheduled tasks), and messages added to a message bus. A programmer of the function would typically have to provide parameters specific to the event source it is tied to.

A serverless function is typically programmed and deployed using command line interface (CLI) tools, an example of which is a serverless framework. In most cases, the deployment is automatic and the function's code is merely uploaded to the FaaS platform. A serverless function can be written in different programming languages, such as JavaScript, Python, Java, and the like. A function typically includes a handler (e.g., handler.js) and third-party libraries accessed by the code of the function. A serverless function also requires a framework file as part of its configuration. Such a file (e.g., serverless.yml) defines at least events that trigger the function and resources to be utilized, deployed or accessed by the function (e.g., database).

When developing software applications, organizations may choose to implement a micro-services design, in which the application is broken into small logical pieces that interact with each other based on the required logic. For example, an eCommerce application may be broken down into the web interface components, user registration service, user authentication service, shopping cart service, discount-coupon-service, check-out service, payment service, and so on. Serverless computing may be used by organizations to develop such microservice-based applications, by implementing the different services as functions, each with its own specific role, and also including other cloud-based services such as cloud databases, cloud storage and so on. Such applications are referred to as Serverless Applications, as the components they are made of are taken from the serverless domain (functions, managed cloud services, etc.).

Serverless applications are made up of disparate components, such as serverless functions and cloud services that are configured to work together in a certain logical order and serve a pre-determined logic based on the application's design. For example, an eCommerce serverless application might be designed to work as follows:
1) User accesses a web site, or a mobile application
2) User registers with the application by providing personal information such as username and password
3) User logs into the application
4) User adds an item to the shopping cart
5) User adds a discount coupon that was given to him, to receive discount
6) User checks-out
7) User submit payment details
8) User finalizes purchase In such applications, attackers may attempt to launch a cyber-attack against the application, by leveraging various logic manipulation attacks or exploit misconfigurations or design flaws in the application.

Given the example eCommerce serverless application above, an attacker might launch one of the following example attacks:
1) Perform all actions, but skip the step #7 (submission of payment details), thus receiving the goods for free
2) in another example, an attacker might learn of a misconfigured database service, and access the database directly in order to steal other users' personal details
3) In another example, a user might add an item to the shopping cart, to which he/she has a 50% discount coupon, then remove that item, and add a much more expensive item, thus tricking the system to apply the 50% discount to the more expensive item While such attacks against applications existed previously, they are more likely to occur in serverless applications given that such applications are made of disparate components and cloud services, which are bound together by configuration, and each such component might be accessed by an unauthorized user.

SUMMARY OF THE INVENTION

It would therefore be advantageous to provide a solution for securing serverless application behavior from attacks that would exploit insecure configurations, insecure logical design, or any type of unauthorized manipulation of the normal flow of the application.

The present invention successfully addresses the shortcomings of the presently known configurations by providing a method for protecting a serverless application According to the present invention there is provided a method for securing a serverless application, the method including: (a) receiving a list of components which make up the serverless application and one or more intended usage flows of the serverless application; (b) creating and applying a security policy for each component of the serverless application, the security policy denying all access requests except from authorized components, wherein the authorized components are selected based on access requirements dictated by the one or more intended usage flows.

According to further features in preferred embodiments the list and the one or more intended usage flows are received as a result of a learning process. According to still further features the learning process includes: (i) extracting the list of the components which make up the serverless application, and (ii) analyzing and learning the one or more intended usage flows of the application; wherein the extracting, analyzing and learning is performed on a knowledge source selected from: (A) instructions dictating intended usage flows, (B) usage flows running in real time during a calibration phase, and (C) records of the usage flows after running in the calibration phase.

According to still further features the one or more intended usage flows include cloud events. According to still further features the method further includes (c) enforcing each security policy. According to still further features the enforcing step is implemented by at least one of: (i) enforcing users to follow the one or more intended usage flows in the serverless application; (ii) denying unauthorized users access to the components of the serverless application; (iii) ensuring that only the authorized components in the serverless application will trigger cloud events and invoke serverless functions; (iv) ensuring that cloud events and related data that is stored in cloud services, are not tampered with by unauthorized entities; (v) ensuring that cloud events and data which enters a first the component arrived from a second the component authorized to access the first component.

According to still further features the security policy is enforced by a serverless runtime protection module. According to still further features the serverless runtime protection module performs: digital signing of data and events with a cryptographic signature prior to sending the data and events to a subsequent component in the serverless application, and validating the cryptographic signature when received in the subsequent component.

According to still further features the serverless runtime protection module denies out-of-order invocation of serverless functions. According to still further features the serverless runtime protection module denies the out-of-order invocation by adding order-sequence identifiers to data or cloud events, and verifying an intended order at each the component.

According to still further features the security policy further includes an indication of an authorized subsequent component according to the one or more intended usage flows.

BRIEF DESCRIPTION OF THE DRAWINGS

Various embodiments are herein described, by way of example only, with reference to the accompanying drawings, wherein:

FIGS. 1A and 1B illustrate a flow diagram of the innovative process;

DESCRIPTION OF THE PREFERRED EMBODIMENTS

Figure 2:
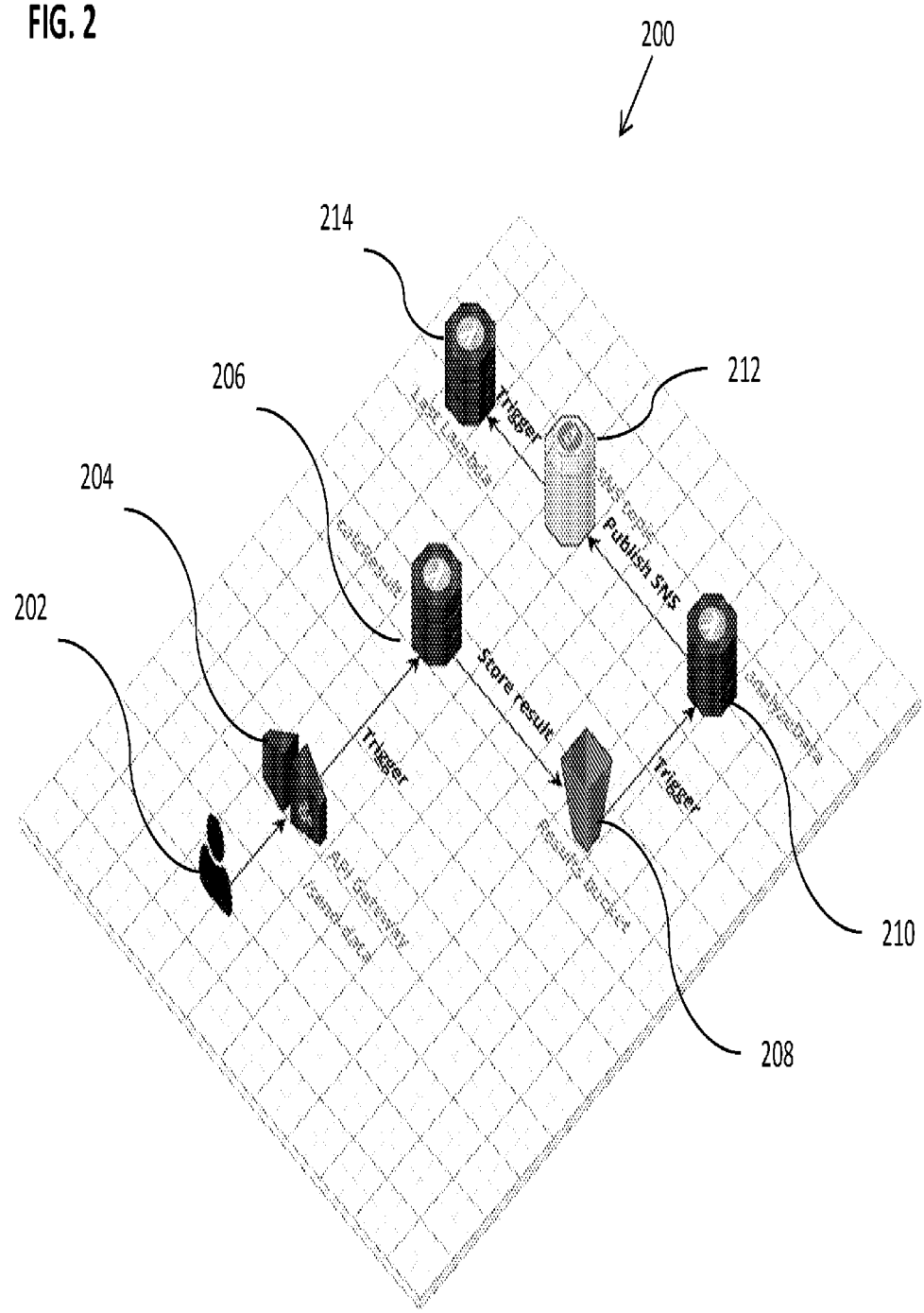
FIG. 2 is a diagrammatic representation of a serverless application.

The principles and operation of a method for protecting a serverless application according to the present invention may be better understood with reference to the drawings and the accompanying description.

According to the present invention there is provided a method for protecting a serverless application. The process has three basic phases: a calibration phase, an implementation phase and an enforcement phase. In the calibration phase, the security system learns or is taught (i.e., provided with the necessary information) what components are found in a given application and what the intended usage flow of the application is.

The 'components' refer to the various entities including the serverless functions that are invoked and the resources that are accessed. Learning about the components and flow refers to any method by which the system discovers how the application works. This can be done by reviewing static code or by observing the application dynamically (e.g., during an initial or calibration stage).

Being taught which components are accessed and the flow process refers to any means by which the security system is provided with the necessary information without performing an autonomous automated process on its own. In summary, during the calibration phase, the security system receives a list of all components which make up the application and one or more intended usage flows of the application.

The second phase is the implementation phase. During the implementation phase, a security policy is created (manually, semi-automatically, or automatically) for each component of the application. Innovatively, the security policy denies access to all other components except for authorized components. The authorized components/entities are selected based on access requirements dictated by the intended usage flow(s).

This is a change in the security policy paradigm. Until now, access privileges were generally forward looking, meaning that a given entity was assigned certain access privileges based on needs and/or access level. If an entity had access privilege to a certain resource, that entity could invoke or access the resource at any time, regardless of whether the instant application flow required such access (at all or even at a specific point in the process). As a result, hackers/malicious users are able to exploit the situation by using a given access privilege to access a resource outside of the intended parameters (e.g., out of order of the defined process steps, skipping one or more steps, hijacking a process to exploit a resource, etc.).

By contrast, the instant method is both backward and forward looking. This means that, for example, a resource is given a security policy which says: only give access to function X because according to the application flow, function X is supposed to access the resource and no other entity. Function X has a similar policy which says deny access from all entities except for the API gateway, because, according to the application flow, the API gateway is the entity that invokes function X (and function X accesses the resource). In this way, each entity of the application looks backwards and allows only the specific entity from the previous step to access that entity itself.

In addition, the security policy can also (as a redundancy) be forward looking, i.e., defining which components each entity is allowed to access. This is also based on the pre-learned flow. So, using the previous example, Function X is only allowed to access the resource (but not, for example, to invoke Function Y) because that is what the usage flow of the application dictates.

The third phase includes enforcement of the security policies. This phase begins once the application is made available for use. Various aspects of the implementation of the enforcement are discussed below in further detail.

In the calibration phase, the automatic learning method includes:

(a) Extracting a list of all the components which make up the serverless application such as: serverless functions, cloud services, users, security permissions, configuration files. It is made clear that the term components includes all users, entities and resources. (When the term 'component' as referred to herein is used in conjunction with other terms (e.g., 'users'), the intent is to emphasize, inter alia, the specific type of component mentioned, but not to detract from the general meaning of the term); and (b) Analyzing and learning the intended usage flow or flows of the application.

The intended usage flow may include the different cloud events used by the system, for example—event sources, event targets and order of events, functions, invocation order, etc.

Analyzing and learning the intended flow of data in the application.

The extracting, analyzing and learning steps can be performed using various techniques such as, but not limited to: static analysis of the code and configuration files, by observing application behavior in real time through code instrumentation, by analyzing application log files, or any other technique which may help to learn about the normal behavior of the application, its users and data.

In the Implementation Phase, the policy creation method includes:

(a) Creating a security policy, that enforces the normal, intended, behavior of the application and all of the components that the application includes.

(b) Applying each created security policy to the relevant component/entity.

In the Enforcement Phase the method includes enforcing the policy of intended behavior of the application, for example:

1. Enforcing users to follow a pre-defined flow in the application;
2. Denying unauthorized users access to sensitive components such as databases or file storage services;
3. Ensuring that only desired components in the system will trigger cloud-events and invoke serverless functions;
4. Ensuring that cloud-events and related data that is stored in different cloud services such as message-queues, databases, file storage, are not tampered with by unauthorized entities;
5. Ensuring that events and data which enters a component such as a serverless function arrived from an authorized component or entity.

Enforcement of the application security policy can be done by using any type of available mechanism such as (but not limited to) those provided by the serverless platform provider, or by using a serverless runtime protection module that is deployed as part of the serverless application. An example a serverless runtime protection module is the Serverless Behavioral Protection Engine disclosed in U.S. patent application Ser. No. 16/161,110, which is incorporated by reference as if fully forth herein.

(a) Denying all users and components in the system from invoking a given serverless function, unless invocation permissions are explicitly allowed in the policy for a certain component or user. As an example, such enforcement can be done by leveraging identity & access management services provided by the cloud provider, and automatically making the necessary configuration as strict as required;

(b) Denying all users and components in the system from accessing data storage services, unless explicitly allowed by the policy to a specific user or component. As an example, such enforcement can be done by leveraging identity & access management services provided by the cloud provider, and automatically making the necessary configuration as strict as required;

(c) Components in the system might digitally sign data or events with a cryptographic signature before sending it off to the next component in the application. The next component can then verify that the data or event was not tampered with, and that it arrived from the expected source. As an example, such enforcement can be implemented by the serverless runtime protection module, which will perform the digital signing of data and events prior to sending them to the next component in the system, and then validating the cryptographic signature in the receiving component by the serverless runtime protection module (d) Denying out-of-order invocation of serverless functions. This can be enforced by adding order-sequence identifiers to data and/or events, and verifying the intended order at each component, by the serverless runtime protection module Referring now to the drawings, FIGS. 1A and 1B illustrate a flow diagram of the instant process for securing a serverless application. The process starts at block 102, starting the Calibration phase. At block 104 the security system receives a list of the components that make up the serverless application as well as a one or more intended usage flows of the serverless application.

The aforementioned information can be received as input, at block 104a, and/or through a learning process at block 104b. At block 104a, the components and usage flows may be input manually or fetched from some element (a file, storage, etc.) having the data.

At block 104b, the learning process includes extracting the list of components which make up the serverless application, as well as analyzing and learning the intended usage flows of the application. There are many learning mechanisms that can be employed in order to learn the necessary information. There are also different knowledge sources from which to learn the information.

At block 105a, the extracting, analyzing and/or learning process can performed on the instructions that dictate the intended usage flows (i.e., prior to deployment). For example, the data can be extracted or learned from the code or from configuration files and the like.

Alternatively or additionally, at block 105b, the extracting, analyzing and/or learning process can be performed by observing the execution of the usage flows running in real time (i.e., during deployment). For example, the usage flows can be run during the calibration phase, so that the security system can learn the desired behaviors and correct usage flows.

Further alternatively or additionally, at block 105c, the extracting, analyzing and/or learning process can be performed on the records of the usage flows. For example, the security system can analyze the application log files after running the flow(s) in the calibration phase.

Once the data is received during the calibration phase, the data is now applied to create the security policies. Block 106 encompasses the implementation phase. At block 106 the security system creates and applies a security policy for each component of the serverless application. Innovatively, the security policy denies all access requests except for requests that come from authorized components. The authorized components themselves are selected based on access requirements dictated by the intended usage flows. That is to say that the policies deny access to all components (those that are part of the serverless application and those that are not), except for the component that is meant to access the immediate component (e.g., invoke a function, access a resource, etc.) according to the usage flow of the application.

FIG. 1B, at block 108, begins the enforcement phase. At block 108, the security system enforces the security policies. The security policies can be enforced by one or more mechanisms. At block 108*a*, mechanisms available from serverless platform provider are used to enforce the policies. For example, the identity & access management (IAM) services can enforce access restrictions. At block 109*a*, the aforementioned mechanisms allow or deny access to components according to authorizations. An authorized component is allowed access, all other components are denied access. According to another type of security mechanism (forward looking), the security policy further includes an indication of an authorized subsequent component according to the intended usage flows.

At block 108*b*, the serverless runtime protection module enforces the security policies. This serverless runtime protection module may enforce all the policies or none of the policies. Alternatively, the module may enforce certain policies while the platform-provided mechanisms enforce other policies. Accordingly, the module may allow or deny access to components according to authorizations (block 109*a*) in place of the platform-provided mechanism(s).

However, only the serverless runtime protection module is able enforce some types of security policies. At block 109*b*, the module performs: digital signing of data and events with a cryptographic signature prior to sending data and events to a subsequent component in the serverless application, and then validating the cryptographic signature when received in the subsequent component.

At block 109*c* is another security process that can only be enforced by the serverless runtime protection module. At block 109*c* the serverless runtime protection module denies out-of-order invocation of serverless functions. The serverless runtime protection module denies such out-of-order invocation by adding order-sequence identifiers to data or cloud events and verifying an intended order at each component.

An Example Implementation of the System and Method for Securing Application Behavior in Serverless Computing FIG. 2 illustrates diagrammatic representation of an exemplary serverless application 200. The serverless application components & entities are:

1. An end user 202.
2. An API (Application Programming Interface) Gateway 204, which accepts API calls on the URL Path/send-data endpoint.
3. A serverless function named "calcResult" 206.
4. A cloud file storage bucket named "Results bucket" 208.
5. A serverless function named "analyzeData" 210.
6. A pub/sub messaging service which accepts messages under a topic named "SNS Topic" 212.
7. A serverless function named "Last Lambda" 214.

The cloud application configuration is as follows:

The API gateway is configured to invoke the serverless function "calcResult" upon receiving an API call to the/send-data endpoint.

The serverless function "calcResult" is configured to store the results of its calculations in the cloud file storage bucket named "Results bucket".

The cloud file storage bucket "Results bucket" is configured to invoke the serverless function "analyzeData" when a new file with the name 'datafile.txt' is created in the bucket.

The serverless function "analyzeData" is configured to store its own data analysis results in the pub/sub messaging service under a topic named "SNS Topic".

The pub/sub messaging service is configured to invoke the serverless function "Last Lambda" when a new message is stored under the pub/sub topic "SNS Topic".

The normal operation flow of the system is as follows:

Step 1: end-user sends an API request with data to the/send-data API endpoint;

Step 2: API Gateway sends a cloud event which triggers the "calcResult" function. The cloud event includes the information about the end-user's API call and data;

Step 3: the "calcResult" function is invoked, and performs data analytics & calculations on the data which arrived from the end-user's API call, and stores the results as a text file in the cloud file storage bucket "Results bucket";

Step 4: The cloud file storage bucket "Results bucket" invokes the serverless function "analyzeData" sending it a notification that a new file (with the name datafile.txt) was created inside the bucket;

Step 5: The serverless function "analyzeData" receives the file change notification event from the cloud file storage bucket, it then goes on to pull the contents of the file, and run its data analysis task on the file;

Step 6: Once the serverless function "analyzeData" finishes its data analysis task, it stores the results of the task as a new message in the pub/sub messaging service, under the topic "SNS Topic";

Step 7: The cloud pub/sub messaging service sends a notification to the serverless function called "Last Lambda", with information about the message identifier "IDENTIFIER" in the messaging service;

Step 8: The serverless function "Last Lambda" is invoked by the cloud pub/sub messaging service notification. It then goes on to pull the message from the message with the identifier "IDENTIFIER" from the message queue, and performs its own analysis tasks on the data.

Example Implementation of the system/method:

1. When the serverless application undergoes the software build process, which assembles all of the source code files and configuration files into the software package to be deployed, it will be statically scanned by the system & method. The scan will yield the following data:

a. A list of all the components which make up the application—this includes the names of the serverless functions ("calcResult", "analyzeData", "Last Lambda"), the cloud services used by the application (API Gateway, Cloud file storage bucket, pub/sub messaging system with a topic called "SNS Topic"), and so forth.

b. Information about the flow of the application—starting from the end-user's API call, continuing with the event trigger from API gateway to the serverless function "calcResult", continuing with the event notification from the bucket to the "analyzeData" function, then the event notification to the "SNS Topic" in the pub/sub messaging service, and the event notification on the new message which invokes the serverless function "Last Lambda"

c. Information about the required security permissions of each entity and component in the system, which are required in order to perform their tasks. For example— the API Gateway needs to be able to invoke the serverless function "calcResult" (and invoke only that function and no other function in the system). The serverless function "calcResult" needs to be able to store files in the cloud file storage bucket "Results bucket", and should only be able to store files in that bucket. In addition, the only permitted operation the function should be allowed to perform on that bucket is to write files to it, and the like.
  d. Information about which entities or components in the application are allowed to trigger/invoke functions in the application.
  e. Information about the order of events in the system (as described earlier). For example, the function "analyzeData" should only be invoked when a file was added to the cloud file storage bucket, by the specific function called "calcResult".

Once the information mentioned above is derived from the source code, the configuration files, or by any other means such as (but not limited to) by inspecting normal operation log files. The system & method will then go on to the next step, which is to generate the relevant security policies, which for this example are created by leveraging two types of policies:
  (1) Runtime Protection Security Policies: these are security policies that are generated for enforcement in each serverless function that is protected by a serverless runtime protection module that is attached to the function and can enforce security policies during the execution of the function.
  (2) Cloud Identity & Access Management (IAM) Security Policies: these are security permissions that are generated by the system & method as cloud IAM configurations and are applied to the entities & components in the cloud account. Enforcement of these security policies and permissions are enforced by the cloud provider's IAM service.

Runtime Protection Security Policies:
  [Policy Deployed on the "calcResult" Function's Runtime Protection Module]

The serverless runtime protection module that is attached to the serverless function "calcResult" is handed a security policy which states that:

The function should ONLY be invoked by the API Gateway component. Further, no other entity or component in the system is allowed to invoke the function. The same policy also specifies that the function will ONLY be allowed to execute if the API gateway endpoint that was accessed by the user was the/send-data endpoint. If the serverless runtime protection module detects that the function is being invoked by a different entity, or via a different API endpoint, it will block the invocation immediately and will report a security violation.

The policy will also enforce that the only possible cloud service the function can interact with is the cloud file storage, and more specifically the bucket "Results bucket". Any other operation on a different cloud service will automatically be blocked (for example, attempts to access a cloud database).

The policy also states that cloud file storage operation on the bucket "Results bucket" will always be a "store" operation. Any other operation will be automatically blocked by the serverless runtime protection module.

It is noted that regular security mechanisms made available by serverless platform providers are not able to distinguish between the operations that the bucket (or any other component for that matter) invokes. It is only the runtime protection module that is able to reach such a level of granularity.

[Policy Deployed on the "analyzeData" Function's Runtime Protection Module]

The serverless runtime protection module that is attached to the serverless function "analyzeData" is handed a security policy which states that:

The function can only be invoked by a file "store" event from the cloud file storage bucket "Results bucket".

The policy also states that the name of the created file should ONLY be "datafile.txt". (This is yet another example of abilities the runtime protection module is capable of and which standard security mechanisms are not; additional examples are provided elsewhere herein.)

The policy also states that the function "analyzeData" should be allowed access to the cloud file storage bucket named "Results bucket", and no other cloud service should be used by the function.

The policy also states that the function "analyzeData" should only be allowed to store messages in the pub/sub cloud messaging service, under the topic "SNS Topic". If the function attempts to interact with any other service, or any other topic, it will be blocked by the serverless runtime protection module.

[Policy Deployed on the "analyzeData" Function's Runtime Protection Module]

The serverless runtime protection module that is attached to the serverless function "Last Lambda" is handed a security policy which states that:

The function can only be invoked by an event from the cloud pub/sub messaging system, and more specifically when a message is stored in the service under the topic "SNS Topic".

The function can only pull messages from that specific service, and from that specific topic.

Cloud Identity & Access Management (IAM) Security Policies:

The system and method mentioned here, will modify the cloud IAM security permissions in the following manner. The system will apply the rules in the order mentioned below, starting with the DENY rules, and only then with the ALLOW rules, which relax the security policy defined by the DENY rules.

[Deny Rules]
  1. No user, entity or component in the system is allowed to invoke any serverless function, unless specified explicitly in the "ALLOW RULES" below.
  2. No user, entity or component in the system is allowed to access any cloud storage buckets, unless specified explicitly in the "ALLOW RULES" below.
  3. No user, entity or component in the system is allowed to store messages in any cloud pub/sub messaging topic, unless specified explicitly in the "ALLOW RULES" below.

[Allow Rules]
  1. The API Gateway is allowed to invoke the serverless function "calcResult".
  2. The serverless function "calcResult" is allowed to store data in the cloud file storage bucket named "Results bucket".
  3. The cloud file storage bucket is allowed to invoke the serverless function "analyzeData".
  4. The serverless function "analyzeData" is allowed to read files from the cloud file storage bucket "Results bucket".

5. The serverless function "analyzeData" is allowed to store pub/sub messages under the topic "SNS topic" in the cloud pub/sub messaging service.
6. The cloud pub/sub messaging service is allowed to invoke the serverless function "Last Lambda".
7. The serverless function "Last Lambda" is allowed to read messages from the cloud pub/sub messaging service, under the topic "SNS Topic".

Validation of Event Data Source

In addition to the Runtime Protection Security Policies and the Cloud Identity & Access Management (IAM) Security Policies, the system and method also provide a way for serverless functions to verify that data they are reading or receiving originated from the expected source (entity, component or serverless function), and that the data was not tampered with while waiting for the function to read it. This is achieved by a cryptographic digital signing logic which is applied by the serverless runtime protection module, prior to sending or storing data in a cloud service, and then by verifying the cryptographic digital signature by the receiving function.

For example, when considering the serverless function "analyzeData" from the example above, by design, the function should only be analyzing the file named "datafile.txt" in the cloud file storage bucket named "Results bucket" and only if this file was created and stored by the previous function "calcResult". When the runtime protection security policy for the function "analyzeData" is created, the system & method will include the cryptographic public key of the function "calcResult" in the policy, together with the name of that function. For example:

{source function name: "calcResult", source function public key: "XYZ"}

The serverless runtime protection module that is attached to the function "calcResult" will include the cryptographic private key of that function. When the function stores the file in the "Results bucket" cloud file storage bucket, the serverless runtime protection module will tag the file using any means available by the cloud provider, such as the tagging facility. The tag will include a digital signature attestation which includes the following data:
1) The digital cryptographic hash of the serverless function's name (i.e., "calcResult")
2) The digital cryptographic has of all the data that was stored in the file When the function "analyzeData" receives the cloud event notification that a file was created in the bucket, its own serverless runtime protection module will read the relevant tag information from the bucket, and will stop the function from reading the contents of the file, until it first verifies that:
1) The file was indeed created by the source function named "calcResult" (by using the public key in the policy to verify the cryptographic hash
2) The file content was not tampered with and matches the cryptographic hash that was reported in the tag.

It should be noted that the above verification mechanism may use the common public/private key cryptography and digital signatures known in the art.

While the invention has been described with respect to a limited number of embodiments, it will be appreciated that many variations, modifications and other applications of the invention may be made. Therefore, the claimed invention as recited in the claims that follow is not limited to the embodiments described herein.

The invention claimed is:
1. A method comprising:
   determining components of a serverless application;
   learning intended behavior of the serverless application, wherein learning intended behavior of the serverless application comprises determining a set of one or more usage flows among the components of the serverless application; and
   creating a set of one or more security policies to restrict behavior of the serverless application to the intended behavior, wherein creating the set of one or more security policies is based, at least in part, on the set of one or more usage flows.
2. The method of claim 1, wherein determining the set of one or more usage flows comprises at least one of observing runtime application behavior of the serverless application with instrumentation and analyzing application log files.
3. The method of claim 1, wherein learning the intended behavior of the serverless application is while running the serverless application during an initial or calibration phase.
4. The method of claim 1, wherein the set of security policies comprise at least one runtime protection policy and at least one identity and access management policy.
5. The method of claim 4, wherein enforcing the runtime protection policy comprises verifying that order-sequence identifiers added to data and/or events of the serverless application conform to one of the set of usage flows.
6. The method of claim 1, wherein the components of the serverless application comprise a serverless function and a resource.
7. The method of claim 6, wherein the components further comprise at least one of a cloud service, a security permission, and a configuration file.
8. The method of claim 1, wherein creating the set of one or more security policies comprises creating at least one security policy for each component that is a serverless function and each component that is a resource, based on the set of usage flows.
9. The method of claim 1, wherein a usage flow indicates at least one invocation of at least one serverless function and/or at least one access of at least one resource.
10. A non-transitory, machine-readable medium having program code stored thereon, the program code comprising instructions to:
    determine components of a serverless application;
    learn intended behavior of the serverless application, wherein the instructions to learn intended behavior of the serverless application comprise instructions to determine a set of one or more usage flows among the components of the serverless application; and
    create a set of one or more security policies to restrict behavior of the serverless application to the intended behavior, wherein creation of the set of one or more security policies is based, at least in part, on the set of one or more usage flows.
11. The non-transitory, machine-readable medium of claim 10, wherein the instructions to determine the set of one or more usage flows comprise at least one of instructions to observe runtime application behavior of the serverless application and instructions to analyze application log files.
12. The non-transitory, machine-readable medium of claim 10, wherein the instructions to learn the intended behavior of the serverless application comprise instructions to run the serverless application in an initial or calibration phase.
13. The non-transitory, machine-readable medium of claim 10, wherein the set of security policies comprise at least one runtime protection policy and at least one identity and access management policy.

14. The non-transitory, machine-readable medium of claim 13 further comprising instructions to verify that order-sequence identifiers added to data and/or events of the serverless application conform to one of the set of usage flows for enforcement of the runtime protection policy.

15. The non-transitory, machine-readable medium of claim 10, wherein the components of the serverless application comprise a serverless function and a resource and wherein a usage flow indicates at least one invocation of at least one serverless function and/or at least one access of at least one resource.

16. The non-transitory, machine-readable medium of claim 10, wherein the instructions to create the set of one or more security policies comprise instructions to create at least one security policy for each component that is a serverless function and each component that is a resource, based on the set of usage flows.

17. An apparatus comprising:
  a processor; and
  a machine-readable medium having instructions stored thereon that are executable by the processor to cause the apparatus to,
  determine components of a serverless application;
  learn intended behavior of the serverless application, wherein the instructions to learn intended behavior of the serverless application comprise instructions to determine a set of one or more usage flows among the components of the serverless application; and
  create a set of one or more security policies to restrict behavior of the serverless application to the intended behavior, wherein creation of the set of one or more security policies is based, at least in part, on the set of one or more usage flows.

18. The apparatus of claim 17, wherein the machine-readable medium further has stored thereon instructions executable by the processor to cause the apparatus to: associate cryptographic keys with a first of the components that accesses data generated by a second of the components, wherein the instructions to create the security policies comprise instructions executable by the processor to cause the apparatus to include the cryptographic keys in the security policies of the first and second components for the second component to digitally sign data generated by the second component and the first component to validate the cryptographic signature and corresponding data.

19. The apparatus of claim 17, wherein the instructions to determine the set of one or more usage flows comprise at least one of instructions to observe runtime application behavior of the serverless application and instructions to analyze application log files.

20. The apparatus of claim 17, wherein the instructions to create the set of one or more security policies comprise instructions executable by the processor to cause the apparatus to create at least one security policy for each component that is a serverless function and each component that is a resource, based on the set of usage flows.

* * * * *